United States Patent
Krupadanam et al.

(10) Patent No.: US 8,290,637 B2
(45) Date of Patent: Oct. 16, 2012

(54) VEHICLE CONTROL USING STOCHASTIC INFORMATION

(75) Inventors: Ashish S. Krupadanam, Rochester Hills, MI (US); Man-Feng Chang, Troy, MI (US); Sanjeev M. Naik, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 504 days.

(21) Appl. No.: 12/479,920

(22) Filed: Jun. 8, 2009

(65) Prior Publication Data

US 2009/0312889 A1 Dec. 17, 2009

Related U.S. Application Data

(60) Provisional application No. 61/061,753, filed on Jun. 16, 2008.

(51) Int. Cl.
G06F 7/00 (2006.01)

(52) U.S. Cl. .............................................. 701/1; 701/36

(58) Field of Classification Search ............. 701/36, 701/1, 104, 111, 112, 118–121, 70; 165/43; 62/179; 180/65.29
See application file for complete search history.

(56) References Cited

U.S. PATENT DOCUMENTS

| 6,435,416 B1 * | 8/2002 | Slassi ........................... 235/492 |
| 2006/0195483 A1 * | 8/2006 | Heider et al. ............... 707/104.1 |
| 2008/0065328 A1 | 3/2008 | Eidehall et al. |

FOREIGN PATENT DOCUMENTS

| JP | 2007-038933 A | 2/2007 |
| JP | 2008-100665 A | 5/2008 |

OTHER PUBLICATIONS

Manzie, C., Fuel Economy Improvements for Urban Driving: Hybrid v. Intelligent Vehicles; Transportation Research Part C 15 (2007) 1-16; ScienceDirect.

Deguchi, Y., HEV Charge/Discharge Control System Based on Navigation Information; 2004-21-0028; Convergence Transportation Electronics Association.

* cited by examiner

Primary Examiner — Thomas Black
Assistant Examiner — Marthe Marc-Coleman (57) ABSTRACT

A method for operating a vehicle includes estimating expected states and probable ranges for influence factors associated with stochastic parameters over a time horizon. A preferred control state and a candidate control state for an objective function are determined. The objective function is controlled using the preferred control state for the objective function over the time horizon.

9 Claims, 3 Drawing Sheets

VEHICLE CONTROL USING STOCHASTIC INFORMATION

CROSS REFERENCE TO RELATED APPLICATIONS

This application claims the benefit of U.S. Provisional Application No. 61/061,753 filed on Jun. 16, 2008 which is hereby incorporated herein by reference.

TECHNICAL FIELD

This disclosure is related to operation and control of motor vehicles.

BACKGROUND

The statements in this section merely provide background information related to the present disclosure and may not constitute prior art.

Known vehicles include a vehicle control system configured to receive and use states of parameters obtained from in-vehicle and extra-vehicle sources that can affect operation of one or more vehicle subsystems. Known vehicle control systems use deterministic control schemes to control operation of vehicle subsystems. Known deterministic control schemes include monitoring states of in-vehicle and extra-vehicle parameters and determining control inputs for one or more control parameters of a vehicle subsystem based thereon.

Extra-vehicle parameters can originate from on-vehicle sensing systems and information transferred from external sources such as satellite broadcasts, smart traffic signals, highway information systems, terrestrial radio broadcasts, peer-to-peer computer networks, navigation system databases, digital map databases, and databases comprising like information. Extra-vehicle parameters can include traffic and environmental conditions, including, e.g., information associated with an expected travel route, weather information, road condition information, and traffic information. The weather information can include levels of water, snow, or ice on the road along with wind speed and wind direction. The traffic information can include traffic density and traffic flow rates of automobiles, bicycles, and pedestrians, and presence of construction projects, vehicle collisions, traffic signals, and like events.

In-vehicle parameters can originate from on-vehicle sensing systems, and can include parameters related to powertrain operation, ride and handling, HVAC, and others. Furthermore there can be historical data related to the in-vehicle and extra-vehicle parameters comprising previously recorded information.

Known vehicle subsystems operate in operating modes characterized by system states with associated state transition discontinuities, hysteresis, transition lag times, and penalties associated with exceeding thresholds. Known vehicle subsystem states include engine transitions between on and off, engine transitions between operating in spark ignition combustion modes, controlled auto-ignition combustion modes, and stratified charge combustion modes and associated engine operation at stoichiometry and lean of stoichiometry. Known vehicle subsystem states include a state of charge of an energy storage device, and an associated allowable range for the state of charge. Transitions between system states can have associated costs and driveability issues with regard to operator perceptions.

States of in-vehicle and extra-vehicle parameters can have uncertainties associated therewith. The uncertainties related to the states of the in-vehicle and extra-vehicle parameters are introduced when predicting vehicle operation over a time horizon into the future. Thus, states of the in-vehicle and extra-vehicle parameters over the time horizon into the future are probabilistic, and the in-vehicle and extra-vehicle parameters are stochastic variables. Furthermore, certain events and conditions are themselves stochastic processes dependent upon other events and conditions. For example, probability of traffic flow problems due to vehicle collisions increases with bad weather, time of day, e.g., rush hour, and seasons, e.g., holiday periods.

SUMMARY

A method for controlling a state of an objective function of a vehicle includes estimating expected states and associated probable ranges for a plurality of influence factors associated with stochastic parameters over a time horizon, determining a preferred control state for an objective function associated with the probable ranges of the influence factors over the time horizon, determining a candidate control state for the objective function associated with the expected states for the influence factors over the time horizon, and controlling the objective function using the preferred control state for the objective function over the time horizon.

BRIEF DESCRIPTION OF THE DRAWINGS

One or more embodiments will now be described, by way of example, with reference to the accompanying drawings, in which.

DETAILED DESCRIPTION

Figure 1:
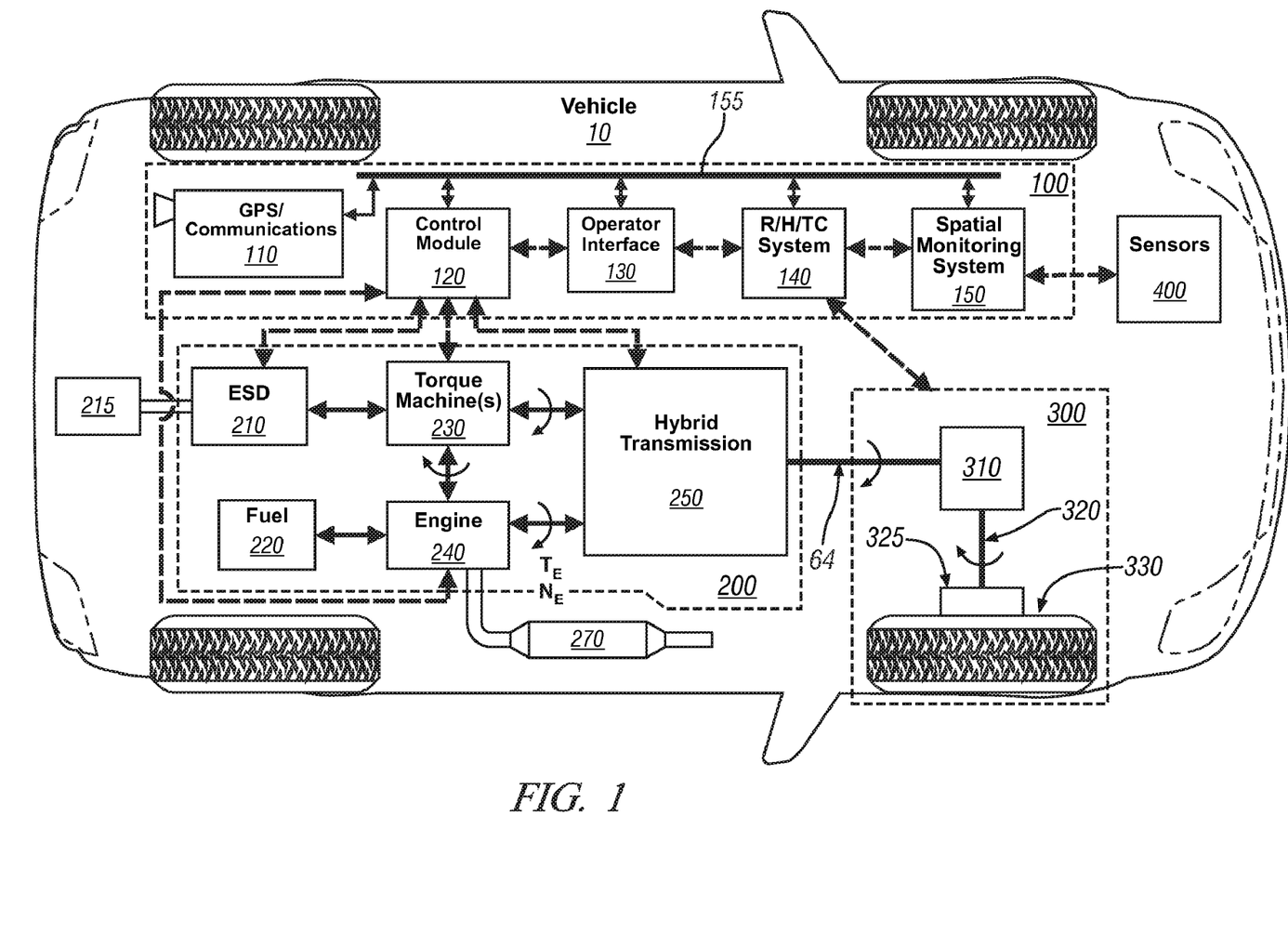
FIG. 1 is a schematic diagram of an exemplary hybrid powertrain in accordance with the present disclosure.

Referring now to the drawings, wherein the showings are for the purpose of illustrating certain exemplary embodiments only and not for the purpose of limiting the same, FIG. 1 schematically shows a vehicle 10 including a control system 100, a hybrid powertrain system 200, and a driveline 300.

The hybrid powertrain system 200 includes an internal combustion engine 240, torque machine(s) 230, and a hybrid transmission 250. An energy storage device (ESD) 210 stores potential energy and is coupled to the torque machine(s) 230 to transfer power therebetween. When the ESD 210 comprises an electrical energy storage device and the torque machine(s) 230 comprise electric motor/generators, controllable power inverter(s) (not shown) can be placed therebetween and used to transform electric power. The torque machine(s) 230 convert stored energy to mechanical power and convert mechanical power to energy that can be stored in the ESD 210. In one embodiment, the ESD 210 connects to a plug-in module 215 that is connectable to externally available electric power via an external charging outlet when the vehicle 10 is stationary. When the plug-in module 215 is connected to the externally available electric power, it converts the electric power to electrically charge the ESD 210.

The internal combustion engine 240 converts fuel stored in a fuel tank 220 to mechanical power using one or more combustion processes. The internal combustion engine 240 has an exhaust aftertreatment system 270 configured to treat an exhaust gas feedstream generated during combustion, consistent with the engine configuration, e.g., the combustion process(es), potential air/fuel ratio operating regimes, and other factors. Preferably, the engine 240 is selectively operative in a plurality of states, including one of an engine-on (ON) state and an engine-off (OFF) state, one of an all-cylinder state and a cylinder deactivation state, and one of a fueled state and a fuel cutoff state.

The hybrid transmission 250 preferably includes differential gearing, selectively applied torque-transfer clutches, and other devices to transfer power between the engine 240, the torque machine(s) 230 and the driveline 300 in one of a plurality of range states including fixed gear and continuously variable range states. Mechanical power from the engine 240 can be transferred to the hybrid transmission 250 and the torque machine(s) 230. Mechanical power from the torque machine(s) 230 can be transferred to the hybrid transmission 250 and the engine 240. Mechanical power from the hybrid transmission 250 can be transferred to the engine 240, the torque machine(s) 230, and the driveline 300 via an output member 64.

The torque machine(s) 230, engine 240 and hybrid transmission 250 each include sensing devices (not shown) for monitoring operation thereof including rotational position sensors, e.g., resolvers, for monitoring rotational position and speed of each of the torque machine(s) 230. The torque machine(s) 230, engine 240 and hybrid transmission 250 include a plurality of actuators (not shown) for controlling operation thereof.

The driveline 300 can include a differential gear device 310 that mechanically couples to an axle 320 or half-shaft (not shown) that mechanically couples to a wheel 330 having a brake device 325 in one embodiment. The differential gear device 310 is coupled to the output member 64. The driveline 300 transfers tractive power between the hybrid transmission 250 and a road surface.

Powertrain systems and drivelines encompassed herein include, e.g., series-hybrid powertrain systems, parallel-hybrid powertrain systems, electric vehicles, extended-range electric vehicle systems, and, powertrain systems having torque machine(s) directly connected to individual wheels of the vehicle in the form of wheel motors.

The control system 100 includes a control module 120, a GPS/communications system 110, and operator interfaces 130. Preferably there is a ride and handling and traction control system (R/H/TC System) 140 and a spatial monitoring system 150, each configured to communicate information in the form of sensor data and control signals via a communications bus 155.

The GPS/communications system 110 preferably includes extra-vehicle communications capability, including, e.g., a short-range vehicle-to-vehicle communications system and a satellite communications system. The GPS/communications system 110 preferably includes a 3-D geographic information system (GIS) digital map system and associated navigation system. The extra-vehicle communications sources can provide information that affects vehicle operating conditions that can be obtained from satellites, smart traffic signals, highway information systems, terrestrial radio broadcasts, and peer-to-peer computer network communications.

The operator interface 130 comprises a plurality of human/machine interface devices through which the vehicle operator commands operation of the vehicle 10, including an accelerator pedal, a brake pedal, and a transmission range selector (PRNDL), none of which are separately illustrated. The operator interface 130 preferably communicates directly with the control module 120 and the ride and handling and traction control system 140. The vehicle operator communicates commands, e.g., an output torque command including an operator torque request, a direction of vehicle travel, i.e., forward or reverse, and a preferred range state for the hybrid transmission 250 through the accelerator pedal, the brake pedal, and the transmission range selector. The operator interface 130 can further include a visual/audio/tactile interface to an on-board navigation system (not shown) that interacts with the GPS/communications system 110.

The spatial monitoring system 150 is signally connected to a plurality of sensors 400 configured to detect and monitor remote objects proximate to the vehicle 10. This can include generating digital images representing the remote objects. The spatial monitoring system 150 preferably determines a linear range, relative speed, and trajectory of each proximate remote object. The sensing devices can include proximity sensors, radar devices, digital cameras, and other devices, none of which are illustrated.

The ride and handling and traction control system 140 includes yaw rate sensors, wheel speed sensors, vehicle speed sensors, and control schemes to manage and control vehicle ride, handling and stability during operation.

The control module 120 is signally connected to sensing devices (not shown) of each of the torque machine(s) 230, the engine 240, the hybrid transmission 250, and the ESD 210 to monitor operation and determine parametric states thereof. Monitored states of the ESD 210 preferably include instantaneous current flow and temperature when the ESD 210 comprises an electrical energy storage device. The control module 120 calculates a parametric state of the ESD 210 indicative of the capacity of the ESD 210 to transfer power to the torque machine(s) 230. The parametric state of the ESD 210 comprises a state-of-charge (SOC) when the ESD 210 is an electrical energy storage device. Monitored states of the engine 240 preferably include engine speed (NE), engine torque (TE) or load, and temperature. Monitored states of the hybrid transmission 250 preferably include rotational speed, and hydraulic pressure at a plurality of locations, from which parametric states comprising application of specific torque transfer clutches (not shown) can be determined. Monitored states of the torque machine(s) 230 preferably include speed(s) (NM) and power flow(s), e.g., electric current flow, from which a parametric state for motor torque(s) (TM) output from the torque machine(s) 230 can be determined.

The control module 120 is operatively connected to the actuators of each of the torque machine(s) 230, the engine 240, and the hybrid transmission 250 to control operation thereof in accordance with executed control schemes that are stored in the form of algorithms and calibrations. The actuators associated with the torque machine(s) 230 can comprise inverter modules (not shown). The actuators associated with the engine 240 can include, e.g., fuel injectors, air flow controllers, spark ignition systems, and other known devices associated with controlling engine operation including controlling the engine states. The actuators associated with the hybrid transmission 250 can include solenoid devices for actuating torque transfer clutches (not shown) to effect operation in specific range states.

The control module 120 preferably comprises one or more general-purpose digital computers, each including a microprocessor or central processing unit, storage mediums comprising read only memory (ROM), random access memory (RAM), electrically programmable read only memory (EPROM), a high speed clock, analog to digital (A/D) and digital to analog (D/A) circuitry, and input/output circuitry and devices (I/O) and appropriate signal conditioning and buffer circuitry. The control module 120 has a set of control algorithms, comprising resident program instructions and calibrations stored in one of the storage mediums and executed to provide desired functions. Information transfer to and from the control module 120 can be accomplished by way of a direct connection, a local area network bus and a serial peripheral interface bus. The algorithms of the control schemes are executed during preset loop cycles such that each algorithm is executed at least once each loop cycle. Algorithms stored in the non-volatile memory devices are executed by the central processing unit to monitor inputs from the sensing devices and execute control and diagnostic routines to control operation of actuators associated with elements of the hybrid powertrain system 200 using calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

Figure 2:
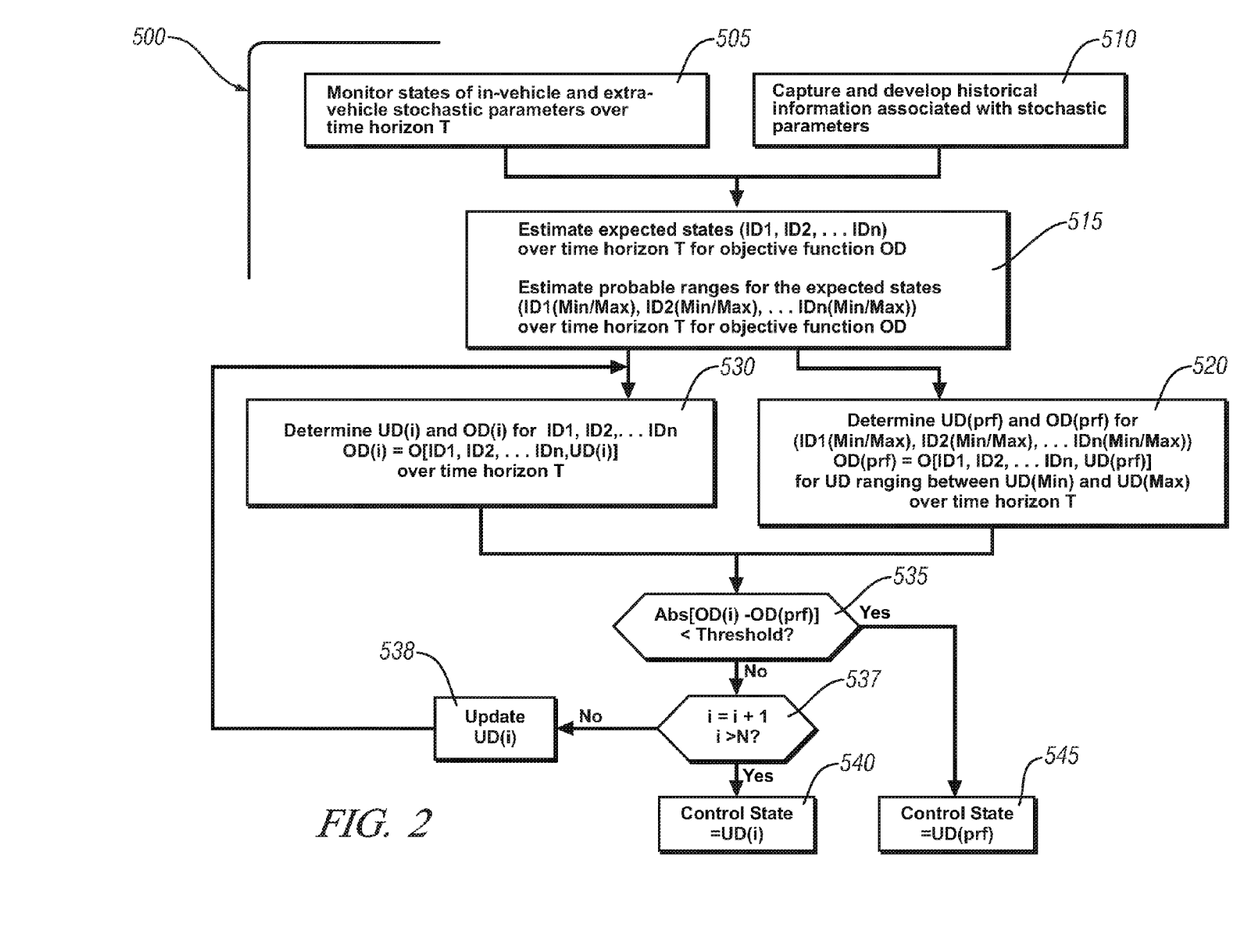
FIGS. 2 and 3 are logical flowcharts associated with the exemplary hybrid powertrain in accordance with the present disclosure.

FIG. 2 shows a method, executed as a control scheme 500 for controlling operation of an objective function of a vehicle, e.g., the exemplary vehicle 10 described with reference to FIG. 1. Objective functions can include control functions that are associated with an area of vehicle operation. Exemplary objective functions include fuel economy, emissions management, safety, ride and handling, travel time, shift quality and driveability, vehicle or component durability, e.g., battery life, and noise/vibration/harshness. The method takes into account predicted states of in-vehicle and extra-vehicle stochastic parameters over a time horizon into the future in determining present control states for one or more objective functions. Stochastic parameters include parameters having random values from which a probability of a defined event, e.g., the objective function, can be determined. Theoretical and empirical models of these stochastic processes and variables can be created to predict expected operating conditions and vehicle states.

In operation, in-vehicle and extra-vehicle stochastic parameters related to a selected objective function (OD) are monitored or otherwise determined at a present time and over a time horizon T (505). The time horizon T comprises a predetermined elapsed period of time projected into the future relative to the present time, and can vary depending upon the selected objective function OD. The magnitude of the time horizon T can be based upon an ability of the control scheme 500 to perceive and otherwise anticipate influence factors that affect the selected objective function OD. Historical information relating to states of the in-vehicle and extra-vehicle stochastic parameters related to the selected objective function OD of the vehicle is captured, developed and otherwise accounted for (510). The stochastic parameters comprise information affecting vehicle operating conditions that is obtained from several sources including onboard sensors and sensors of external systems, as previously described. The historical data can include vehicle operational information that has been recorded and analyzed and reduced during previous vehicle operating cycles related to operator preferences and other factors associated with a specific objective function of the vehicle. The historical data can include route information associated with a specific objective function obtained from navigation system databases, enhanced digital map databases, and databases comprising like information.

The stochastic parameters and the historical information associated with the stochastic parameters are used to estimate a plurality of influence factors (ID) that are associated with the states of the present and projected in-vehicle and extra-vehicle stochastic parameters over the time horizon T, including expected states for the influence factors (ID1, ID2, . . . IDn) and associated probable ranges of the expected states for the influence factors ID1 (Min/Max), ID2(Min/Max), . . . IDn(Min/Max) . . . IDn that are associated with the states of the present and projected in-vehicle and extra-vehicle stochastic parameters (515). The influence factors ID1, ID2, . . . IDn are those factors that are related to one of the objective functions OD associated with vehicle operation. Exemplary influence factors include traffic influence factors comprising traffic density, localized traffic flow rate, presence of construction projects, presence of collisions, traffic signals, and pedestrian and bicycle traffic levels. There can be second-order effects with the traffic influence factors associated with weather, time-of-day and day of week, traffic signals, and occurrence of special events. Exemplary influence factors can further include environmental factors including ambient temperature, amount and type of precipitation, e.g., water, snow, or ice on the road, and wind speed and wind direction.

A candidate objective function state OD(i) is determined that is responsive to a candidate control state UD(i) and associated with the estimated expected states for the influence factors ID1, ID2, . . . IDn (530), using Eq. 1.

$$OD(i)=O[ID1,ID2,\ldots IDn,UD(i)] \quad [1]$$

The candidate control state UD(i) can be one of a plurality of control states over a linear or non-linear range between a minimum control state UD(Min) and a maximum control state UD(Max). Alternatively, the candidate control state UD(i) can be one of two or more discrete control states, e.g., an ON control state and an OFF control state.

A preferred control state UD(prf) for the objective function OD associated with the estimated expected states and the associated probable ranges of the expected states for the influence factors ID1 (Min/Max), ID2(Min/Max), . . . IDn (Min/Max) over the time horizon T can be determined for a range of the control state UD between the minimum state UD(Min) and the maximum state UD(Max) (520), expressed as:

$$OD(prf)=O[ID1,ID2,\ldots IDn,UD(prf)] \quad [2]$$

The candidate objective function state OD(i) determined using the candidate control state UD(i) is compared to the preferred objective function state OD(prf) determined using the preferred control state UD(prf) over the time horizon (535).

The candidate objective function state OD(i) is compared to the preferred objective function state OD(prf). So long as a difference between the candidate objective function state OD(i) and the preferred objective function state OD(prf) is less than a predetermined threshold (Threshold), the preferred control state UD(prf) is used in the control scheme 500 to control operation to achieve the preferred objective function state OD(prf) over the time horizon T (545).

When the difference between the candidate objective function state OD(i) and the preferred objective function state OD(prf) is not less than the predetermined threshold (Threshold), the candidate control state UD(i) is incremented (537) and the process repeats for N iterations as the candidate control state UD(i) sequentially increments between the minimum control state UD(Min) and the maximum control state UD(Max) (Update UD(i)) (538). The process of determining the candidate objective function state OD(i) and associated with the estimated expected states for the influence factors ID1, ID2, . . . IDn is repeated with the sequentially incremented candidate control state UD(i) (530).

When the difference between the candidate objective function state OD(i) and the preferred objective function state OD(prf) fails to exceed the predetermined threshold (Threshold) after N iterations are completed over the range between the minimum control state UD(Min) and the maximum control state UD(Max), the candidate control state UD(i) is used in the control scheme 500 to control operation to achieve the candidate objective function state OD(i) (540). The selected one of the preferred control state UD(prf) and the candidate control state UD(i) is fed back into the control scheme 500.

Figure 3:
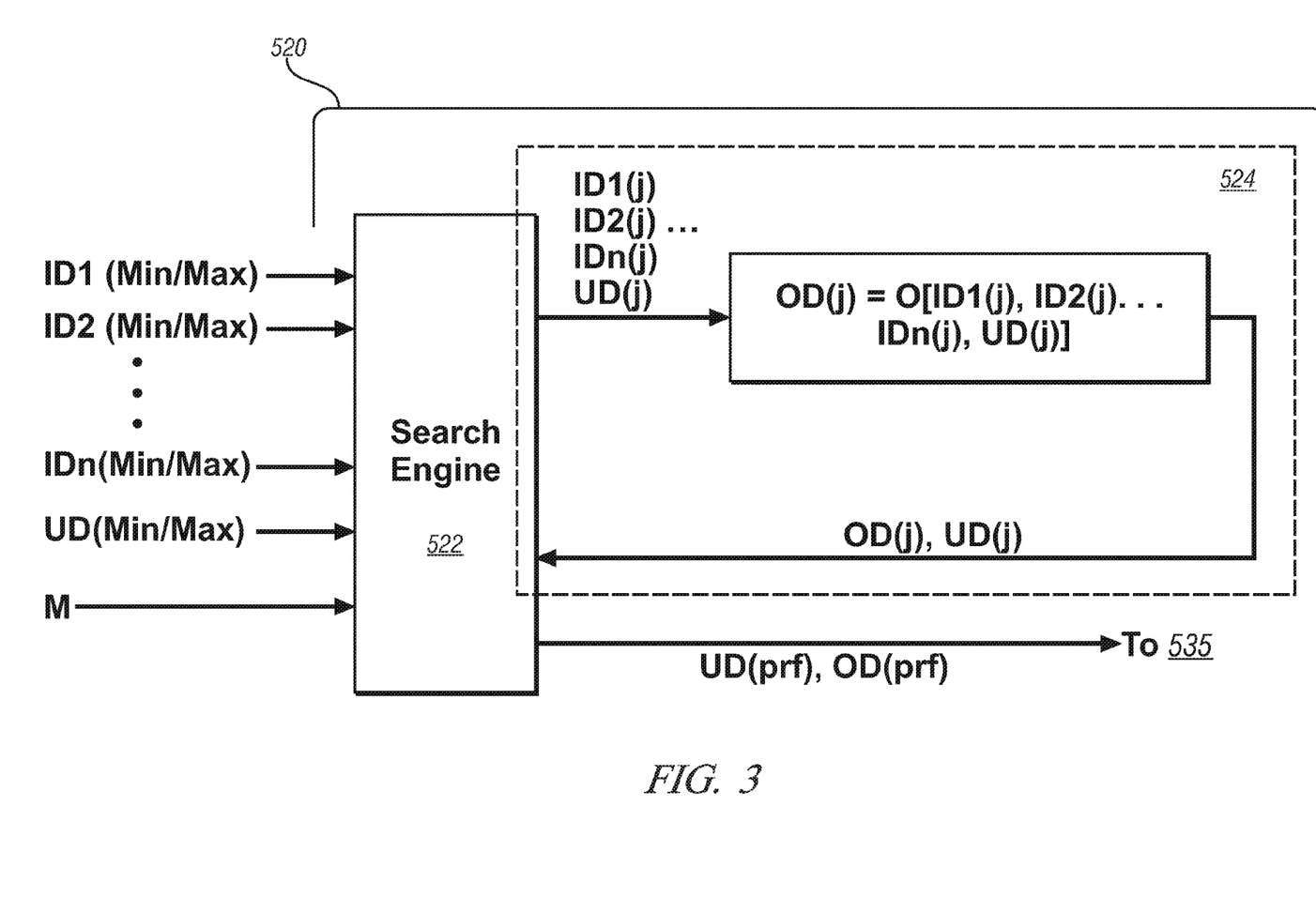

FIG. 3 depicts one method for determining a preferred control state UD(prf) comprising employing a multi-dimensional search engine (Search Engine) 522 that is executed as algorithmic code in the control module 120. Inputs to the search engine 522 include the probable ranges for each of the influence factors ID1(Min/Max), ID2(Min/Max) . . . IDn (Min/Max) over the time horizon T and the range for the control state (UD(Min/Max)) associated with the minimum control state UD(Min) and the maximum control state UD(Max). The probable ranges for each of the influence factors can include some form of statistics-based probability density function that takes into account a likelihood of occurrence of each influence factor achieving a value within the probable range. The search engine iteratively generates candidate probable states for the influence factors ID1(j), ID2(j), IDn(j) and a candidate control state (UD(j)) within the probable ranges for each of the influence factors ID1(Min/Max), ID2(Min/Max), . . . IDn(Min/Max) over the time horizon T and the range for the control state (UD(Min/Max)) associated with the minimum control state UD(Min) and the maximum control state UD(Max). A calculation loop 524 includes executing Eq. 1, above, using the candidate probable states for the influence factors ID1(j), ID2(j), IDn(j) and a candidate control state (UD(j)) determine a parametric state for the candidate objective function OD(j) associated with candidate control state (UD(j)). The subscript "j" refers to a specific iteration, and ranges in value from 1 to M. The quantity of iterations M can be generated by any one of a number of methods, either internal to the search engine, or as a part of the overall method. The quantity of iterations M may be the same numerical value as the quantity of iterations N used to determine the candidate objective function state OD(i) responsive to candidate control states UD(i) and associated with the estimated expected states for the influence factors ID1, ID2, . . . IDn, determined as described hereinabove with respect to FIG. 2 at 530.

The resultant parametric state for the candidate objective function OD(j) and the associated candidate control state UD(j) are input back to the search engine 522 each iteration. The search engine 522 iteratively evaluates the parametric state for the candidate objective function OD(j) and the associated candidate control state UD(j) and selects new parametric values for the candidate parametric states for the candidate influence factors ID1(j), ID2(j), . . . IDn(j) and the candidate control state (UD)j)) to search for a preferred control state UD(prf). The search engine 522 iteratively searches to identify the preferred control state UD(prf) comprising one of the candidate control states (UD(j) that achieves a preferred objective function OD(prf). The preferred objective function OD(prf) comprises either a minimum value or a maximum value for the objective function OD within the probable ranges for each of the influence factors ID1 (Min/Max), ID2 (Min/Max), . . . IDn (Min/Max) and the range for the control state (UD(Min/Max)) over the time horizon T.

In one embodiment, the preferred control state UD(prf) is the candidate control state UD(j) that achieves a minimum objective function OD associated with the estimated expected states and probable ranges of the influence factors ID1, ID2, . . . IDn over the time horizon T. In one embodiment, the preferred control state UD(prf) is the candidate control state UD(j) that achieves a maximum objective function OD associated with the estimated expected states and probable ranges of the influence factors ID1, ID2, . . . IDn over the time horizon T.

One embodiment of the control scheme 500 for operating the exemplary vehicle 10 described with reference to FIG. 1 includes the control state UD comprising a ratio between tractive power generated by the torque machine(s) 230 and tractive power generated by the engine 240 which is transferred to the driveline 300 via the hybrid transmission 250. The associated objective function OD comprises the mass of fuel consumed over the time horizon T, e.g., 20 seconds. The influence factor ID comprises a probable vehicle velocity and associated power profile at the vehicle wheels 330 required to respond to an operator torque request and taking into account in-vehicle and extra-vehicle stochastic parameters that include present and projected future information over the time horizon T. The in-vehicle stochastic parameters include a projected operator torque request, including a probability of deceleration and/or braking and associated effects upon state of charge of the ESD 210 due to regenerative braking, a probability of increased vehicle speed and associated vehicle acceleration and associated effects upon state of charge of the ESD 210 and fuel consumption. The extra-vehicle stochastic parameters include the traffic influence factors and environmental factors related to projected traffic conditions, traffic light patterns, and changes in elevation along a projected navigation route that affect the expected vehicle velocity and associated power profile at the vehicle wheels 330.

One embodiment of the control scheme 500 for operating the exemplary vehicle 10 described with reference to FIG. 1 includes the control state UD comprising engine air/fuel ratio, with an associated objective function OD comprising NOx loading on a lean NOx adsorber that is an element of the exhaust aftertreatment system 270. The influence factor ID comprises a projected road load and associated engine load over the time horizon T.

The lean NOx adsorber adsorbs NOx emissions during lean air/fuel ratio operation of the engine 240, and regenerates by desorbing and reducing the NOx emissions during a rich air/fuel ratio excursion. The lean NOx adsorber requires periodic regeneration to avoid saturation and associated increases in exhaust emissions. A rich air/fuel ratio excursion can occur during ongoing vehicle operation, e.g., in response to a high-speed or high-load operating condition related to ascending a hill. A rich excursion can occur intrusively by commanding the engine 240 to operate at stoichiometry or rich of stoichiometry during ongoing operation. There is an increase in fuel consumption associated with any intrusive rich excursion for regeneration of the lean NOx adsorber.

In operation, the influence factor ID comprises the projected road load and associated engine load over the time horizon T. The influence factor ID can indicate probability of an increased engine load condition, for example, in response to presence of a steep road grade. The control scheme 500 can command the vehicle control system to delay the regeneration until the engine 240 is operating at the high-load operating condition based upon the probable change in road load, i.e., the influence factor ID. The vehicle control system can delay adjusting the control state UD comprising engine air/fuel ratio and associated regeneration of the lean NOx adsorber until the high engine load condition is required to achieve a desired propulsion level, thus avoiding or minimizing any intrusive rich excursion to regenerate the lean NOx adsorber. This is achievable so long as the associated objective function OD comprising NOx loading on the lean NOx adsorber is below the saturation level. Thus, fuel consumption can be decreased.

Similarly a particulate filter that is an element of the exhaust aftertreatment system 270 can be regenerated when the vehicle 10 operates at high engine load conditions resulting in high exhaust gas feedstream temperatures. Thus, the control state UD comprises engine fueling and air/fuel ratio associated with exhaust gas feedstream temperatures, including one of a lean air/fuel ratio and a rich air/fuel ratio. Associated objective functions OD can comprise temperature of the exhaust gas feedstream and particulate loading on the particulate filter. The influence factor ID comprises a projected road load and associated engine load over the time horizon T.

When the engine 240 operates under low engine load conditions for extended periods of time with limited opportunity to regenerate the particulate filter, the control state UD comprises intrusive engine fueling and air/fuel ratio associated with exhaust gas feedstream temperatures to actively regenerate the particulate filter by periodically increasing exhaust temperature and nitrogen dioxide levels to oxidize particulates when the particulate filter approaches or achieves a predetermined loading level. When the influence factors ID indicate that the projected road load and associated engine load over the time horizon T will result in the engine operating at a high exhaust temperature and high nitrogen dioxide levels to achieve the operator torque request related to vehicle propulsion levels, the control scheme 500 can delay or avoid the control state UD comprising intrusive engine fueling and air/fuel ratio associated with exhaust gas feedstream temperatures to actively regenerate the particulate filter. Thus, fuel consumption is reduced by reducing the amount of time the engine operates with a rich combustion mixture.

One embodiment of the control scheme 500 for operating the exemplary vehicle 10 described with reference to FIG. 1 includes the control state UD comprising the mass of fuel consumed over the time horizon T, e.g., 20 seconds, with an associated objective function OD comprising state-of-charge of the ESD 210. The influence factor ID comprises a projected road load and associated opportunity charging of the ESD over the time horizon T. The associated opportunity charging can result from probability of regenerative braking and vehicle coasting that may occur over the time horizon T. Thus, operation of the vehicle can include decreasing the control state UD comprising the mass of fuel consumed over the time horizon T, and correspondingly increasing the percentage of tractive power that is generated by the torque machine(s) 230 in response to an operator torque request when there is a high probability of increasing the objective function OD comprising the state-of-charge of the ESD 210 as a result of regenerative braking and vehicle coasting that may occur over the time horizon T.

One embodiment of the control scheme 500 for operating the exemplary vehicle 10 described with reference to FIG. 1 includes the control state UD comprising engine operation (ON or OFF) with an associated objective function OD comprising state-of-charge of the ESD 210. The influence factors ID comprise a projected distance to a charging outlet and associated opportunity charging over the time horizon T when the vehicle 10 comprises a plug-in hybrid vehicle. Thus, in operation, the control scheme 500 can permit the ESD 210 to discharge to a lower state-of-charge (SOC) and avoid or minimize operation of the engine 240 when it is determined that the vehicle 10 will soon be plugged into the charging outlet, for example, when the vehicle is approaching a known charging destination, such as the vehicle operator's home or workplace. Thus, the vehicle control system determines an optimal control value to utilize increased levels of battery power which is replenished from outlet power once the vehicle reaches the charging destination.

One embodiment of the control scheme 500 for operating the exemplary vehicle 10 described with reference to FIG. 1 includes the control state UD comprising engine operation (ON or OFF) with an associated objective function OD comprising the mass of fuel consumed over the time horizon T. The influence factors ID comprise traffic information related to an approaching intersection. In operation, when the influence factors ID comprising traffic information related to an approaching intersection indicate a high probability that the vehicle 10 will stop, the control scheme 500 can aggressively transition the engine from ON to OFF to minimize fuel consumption. This can include immediately transitioning the engine from ON to OFF when an operator torque request indicates an intention to slow and stop the vehicle at the intersection, e.g., an operator torque request comprising an operator tip-out or partial tip-out of the accelerator pedal. In addition, there can be a second, associated objective function comprising the SOC of the ESC 210 associated with the control state UD comprising engine operation (ON or OFF). In operation, when the influence factors ID comprising traffic information related to an approaching intersection indicate a high probability that the vehicle 10 will have to stop, the control scheme 500 can aggressively transition the engine from ON to OFF to increase the objective function OD comprising the state-of-charge of the ESD 210 as a result of regenerative braking and vehicle coasting that may occur over the time horizon T with the engine.

One embodiment of the control scheme 500 for operating the exemplary vehicle 10 described with reference to FIG. 1 includes the control state UD comprising a control state for active suspension damping control of the ride and handling and traction control system 140, comprising one of a soft response, a normal response, and a performance response. The associated objective functions OD comprise yaw rate and wheel traction of the vehicle 10. The influence factors ID comprise a projected road surface roughness, projected road surface conditions associated with temperature and precipitation, projected presence of curves in the road, and projected vehicle speed over the time horizon T. The associated objective function OD comprising yaw rate can be determined using a yaw rate sensor. The associated objective function OD comprising wheel traction 10 can be determined, e.g., by monitoring and comparing signal inputs from wheel speed sensors.

One embodiment of the control scheme 500 for operating the exemplary vehicle 10 described with reference to FIG. 1 includes the control state UD comprising braking effort applied to the vehicle brakes 325 over the time horizon T, e.g., 20 seconds, with an associated objective function OD comprising operator input to the brake pedal. The influence factor ID comprises traffic information, including traffic signal timing relative to vehicle location, speed and acceleration over the time horizon T. Thus, the influence factor ID can indicate probability of a hard stop, that is, a rapid deceleration. When the control system determines a high probability of an operating condition associated with a hard-stop, the vehicle control system determines an optimal control value for a braking profile associated with rapid deceleration of the vehicle 10. For example, the control scheme 500 can selectively employ a hard-stop braking profile in response to the operator input to the brake pedal when the influence factor ID indicates that an upcoming traffic signal indicates imminent stopping.

One embodiment of the control scheme 500 for operating the exemplary vehicle 10 described with reference to FIG. 1 includes the control state UD comprising one or more travel routes to a destination with an associated objective function OD comprising travel time to the destination. The influence factor ID comprises projected traffic and weather conditions related to the one or more travel routes to the destination. The control scheme 500 selects a preferred one of the travel routes for the vehicle 10 based on the influence factors ID. The preferred travel route for the vehicle can be provided to the vehicle operator via the operator interface 130 including the visual/audio interface. For example, the control system can use the influence factors ID to select a preferred travel route having the best statistical overall travel time, for example, a distribution of probable travel times or lowest mean travel time, or other combinations of different statistical measures.

One embodiment of the control scheme 500 for operating the exemplary vehicle 10 described with reference to FIG. 1 includes the control state UD comprising charging and discharging the of the ESD and associated SOC of the ESD 210. The associated objective function OD comprises a state-of-life of the ESD 210. The influence factors ID comprise projected traffic conditions, including those indicative of whether the vehicle will accelerate over the time horizon T.

For example, when the control scheme 500 predicts a high probability of an operating condition in which the vehicle will likely accelerate, such as when the vehicle is at a stop light and when traffic volume is low, the control scheme 500 controls the control state UD comprising charging and discharging the of the ESD 210 and associated SOC of the ESD 210 to maintain or increase the SOC of the ESD 210 at or above an upper SOC threshold. The increased SOC of the ESD 210 is in anticipation of an imminent discharge event. During the subsequent vehicle acceleration event, the powertrain control scheme can operate for an extended period of time using the torque machine(s) 230 to provide tractive torque before reaching a minimum SOC level, thus decreasing fuel consumption and prolonging state-of-life of the ESD 210.

One embodiment of the control scheme 500 for operating the exemplary vehicle 10 described with reference to FIG. 1 includes the control state UD comprising one of a plurality of shift schedules for the transmission 250 associated with the operator torque request, vehicle load, and vehicle speed. Examples of shift schedules for the transmission 250 can include a first transmission shift schedule associated with a moderate operator torque request, and a second transmission shift schedule associated with an aggressive operator torque request. An associated objective function OD comprises an expected operator input to an accelerator pedal. The influence factor ID comprises traffic information, including traffic signal timing relative to vehicle location, speed and acceleration over the time horizon T, and historical data related to operator torque requests at the vehicle location. The influence factors ID can indicate an expected operator input to the accelerator pedal over the time horizon T. Thus, the control scheme 500 can select a preferred one of the first and second transmission shift schedules associated with a probable operator torque request over the time horizon T.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a state of an objective function of a vehicle, comprising:
   estimating expected states and associated probable ranges for a plurality of influence factors associated with stochastic parameters over a time horizon;
   determining a preferred control state for an objective function associated with the probable ranges of the influence factors over the time horizon;
   determining a candidate control state for the objective function associated with the expected states for the influence factors over the time horizon;
   controlling the objective function using the preferred control state for the objective function over the time horizon when a difference between a preferred objective function state determined using the preferred control state and the candidate objective function state determined using the candidate control state is less than a threshold; and
   controlling the objective function using the candidate control state for the objective function over the time horizon only when the difference between the preferred objective function state determined using the preferred control state and the candidate objective function state determined using the candidate control state is not less than the threshold.

2. The method of claim 1, further comprising:
   developing historical data related to states of in-vehicle and extra-vehicle stochastic parameters related to the objective function of the vehicle;
   determining present and projected states of the in-vehicle and extra-vehicle stochastic parameters related to the objective function of the vehicle; and
   wherein estimating the expected states and the associated probable ranges for the plurality of influence factors associated with the stochastic parameters over the time horizon comprises estimating the expected states and the associated probable ranges for the plurality of influence factors associated with the stochastic parameters over the time horizon based upon the historical data and the present and projected states of the in-vehicle and extra-vehicle stochastic parameters related to the objective function of the vehicle.

3. The method of claim 1, further comprising:
   determining a plurality of candidate control states for the objective function associated with the expected states for the influence factors over the time horizon; and
   wherein controlling the objective function using the preferred control state for the objective function over the time horizon is effected when each respective difference between a preferred objective function state determined using the preferred control state and each of a plurality of candidate objective function states determined using each of the candidate control states is less than a threshold.

4. The method of claim 3, wherein determining the plurality of control states for the objective function comprises iteratively generating the candidate control states from one of a plurality of control states for the objective function associated with the expected states for the influence factors over the time horizon.

5. The method of claim 4, wherein iteratively generating the candidate control states comprises sequentially incrementing between a minimum control state and a maximum control state.

6. The method of claim 4, wherein iteratively generating candidate control states comprises sequentially selecting one of a plurality of discrete control states.

7. The method of claim 1, wherein estimating the expected states and the associated probable ranges for the plurality of influence factors comprises estimating the expected states and the associated probable ranges for the plurality of influence factors associated with states of present and projected in-vehicle and extra-vehicle stochastic parameters determined over the time horizon.

8. The method of claim 7, further comprising determining the states of the present and projected in-vehicle and extra-vehicle stochastic parameters associated with the objective function of the vehicle over the time horizon.

9. The method of claim 1, wherein determining the preferred control state for the objective function associated with the probable ranges of the influence factors over the time horizon comprises:

iteratively generating candidate control states for the objective function;

iteratively generating candidate probable states for the influence factors associated with the probable ranges for the influence factors over the time horizon;

determining candidate objective function states associated with the iteratively generated candidate control states for the objective function and the iteratively generated candidate probable states for the influence factors; and selecting a minimum of the candidate objective function states as a preferred objective function state and selecting the associated control state for the preferred objective function state as the preferred control state for the objective function.

* * * * *